(12) United States Patent
Macbeth

(10) Patent No.: US 6,198,611 B1
(45) Date of Patent: *Mar. 6, 2001

(54) ARC FAULT CIRCUIT INTERRUPTER WITHOUT DC SUPPLY

(75) Inventor: Bruce F. Macbeth, Syracuse, NY (US)

(73) Assignee: Pass & Seymour, Inc., Syracuse, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/314,296

(22) Filed: May 19, 1999

Related U.S. Application Data

(63) Continuation-in-part of application No. 09/211,747, filed on Dec. 15, 1998.

(51) Int. Cl.[7] .................................................. H02H 3/00
(52) U.S. Cl. ................................................................ 361/42
(58) Field of Search .................. 361/42–50; 324/418–424, 324/244.1, 509–511, 536, 541, 542, 544

(56) References Cited

U.S. PATENT DOCUMENTS 5,185,686 * 2/1993 Hansen et al. .......................... 361/45
5,459,630 * 10/1995 MacKenzie et al. .................. 361/45

* cited by examiner

*Primary Examiner*—Ronald W. Leja
(74) *Attorney, Agent, or Firm*—Wall Marjama & Bilinski

(57) ABSTRACT

Arcing faults are detected by sensing a voltage signal proportional to the rate of change, or di/dt, of the line current when the current steps into an arc fault. A current transformer is used to create the di/dt signal. The transformer has a selected core type, number of windings, and size which saturates at a pre determined level of primary current. The saturation acts to clamp the maximum di/dt voltage signal at the transformer output, and produce a constant output voltage. The constant output voltage eliminates a signal with a high di/dt, which may occur during a lamp burnout, from producing a much larger di/dt signal than that caused by an arc fault at a lower level of step current. The di/dt signal is passed through a high pass filter, which attenuates 60 hz sinusoidal signals, after which the signal is integrated. The integrator acts to delay circuit interruption means until a predetermined number of arcs has occurred. When the integrator voltage reaches a predetermined voltage level, a trigger device activates an electronic switch, which in turn activates circuit interrupting means. One of the novel aspects of this invention is the elimination of the need for a DC power supply.

15 Claims, 4 Drawing Sheets

ARC FAULT CIRCUIT INTERRUPTER WITHOUT DC SUPPLY

CROSS REFERENCE TO RELATED APPLICATIONS

This application is a continuation-in-part of Ser. No. 09/211,747 filed Dec. 15, 1998.

BACKGROUND OF THE INVENTION

1. Field of the Invention

This invention relates to an apparatus for arc faults in electrical power lines, and more particularly to apparatus that does not include a DC power supply.

2. Description of the Prior Art

A number of devices and methods have been used in the past to detect arc faults. Some of the prior art devices and techniques have involved the use of E and B field arc sensors, the detection of the amplitude of arc fault rate of change of current signals, the use of non-overlapping band-pass filters to detect white noise of arcs, and devices which detect the disappearance of arc faults near current zero crosses. Most of the prior art of arc detection occurs in circuit breakers where it acts as an enhancement to thermal-magnetic detection elements, which alone may fail to detect arc faults.

There is a need for an economical arc fault detector which may be mounted into a wiring device which offers the same down stream protection as an arc fault detecting circuit breaker but at the similar cost advantage that currently exist between ground fault interrupting receptacles and ground fault interrupting circuit breakers. This invention provides that cost advantage.

SUMMARY OF THE INVENTION

It is an object of this invention to provide an arc fault circuit interrupter that is simpler and less expensive to manufacture than those previously known. Briefly stated, and in accordance with a presently preferred embodiment of the invention, an arc fault detecting circuit includes a saturating current transformer coupled to the electric power circuit to be protected that senses di/dt arc fault steps in current. A rectifier is preferably connected to the sensor, and an integrator is connected to the rectifier. The integrator voltage is used to activate a trigger device. The trigger device activates circuit interrupting means. The device does not require a DC power supply as found in the prior art.

The saturating current transformer produces a constant output voltage at a pre determined level of arc fault current. This eliminates the effect of brief high current pulses of short duration from having the same effect on the detector as a series of smaller amplitude arc faults steps.

In accordance with a further embodiment of the invention, a second integrator and trigger device is used instead of a saturating transformer to mitigate the effect of normal switching arcs and also the brief high current arc pulses.

In accordance with another embodiment of the invention, an inhibit switch is placed between the integrator and trigger device, where it acts to inhibit the di/dt charging integrator from activating the trigger device unless the associated peak 60 Hz component of arc current exceeds a predetermined value.

DESCRIPTION OF THE PREFERRED EMBODIMENT

Figure 1:
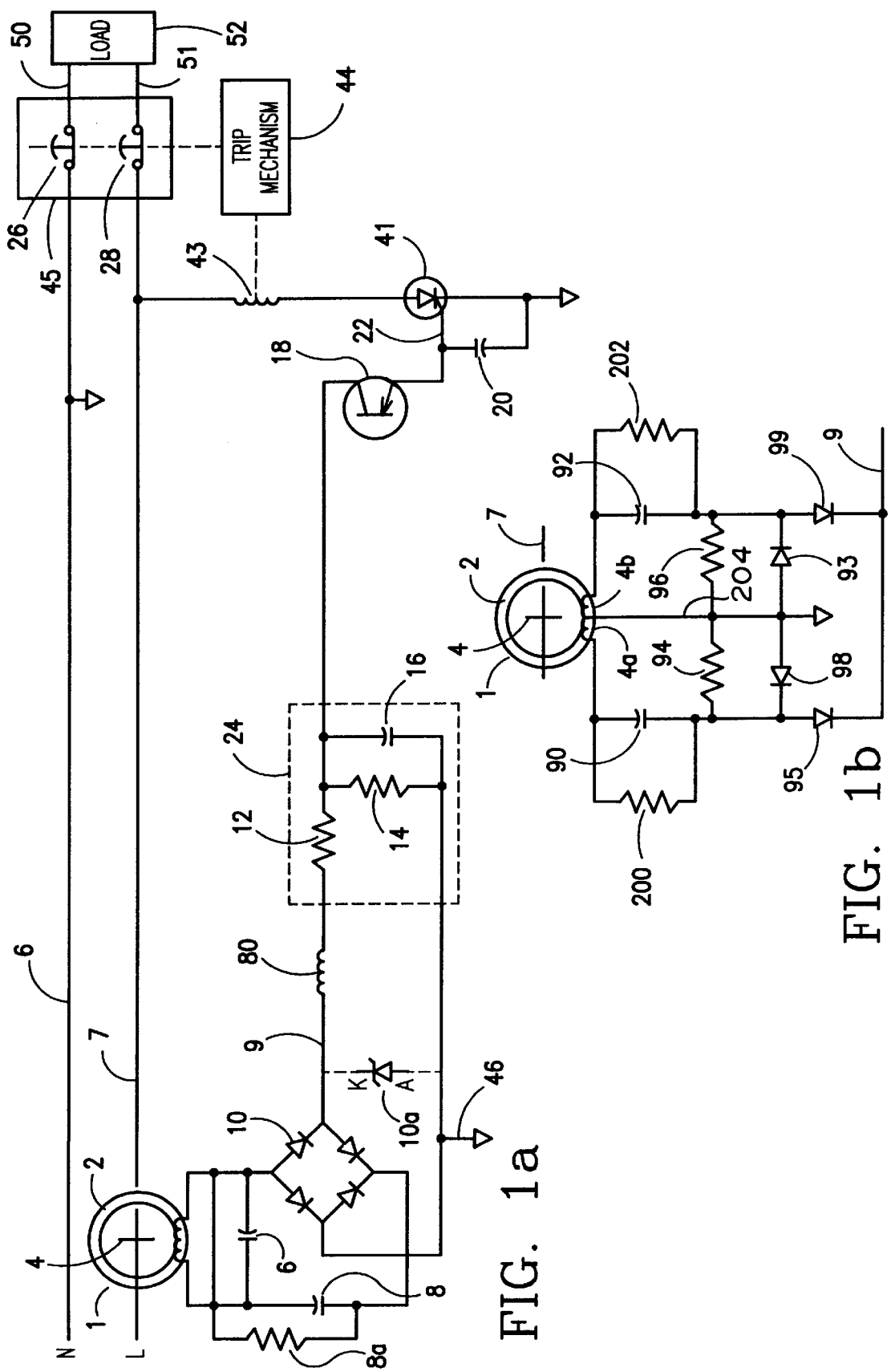
FIG. 1(a–b) illustrate the circuit in which arc fault detection is performed.

An arc fault detector in accordance with this invention is intended for incorporation into a receptacle, plug, or cord type device which is mechanically similar to ground fault interrupter devices such as those shown in U.S. Pat. Nos. 5,594,358, and 5,510,760.

Referring now to FIG. 1a, one embodiment of the invention is shown in schematic diagram form, showing an electrical power line, comprising line side neutral and hot conductors 6 and 7 respectively, load neutral and hot conductors 50 and 51 respectively and a load 52. The load neutral 50 and hot 51 conductors are both protected by contactor mechanism 45. Contactor mechanism 45 is a spring loaded mouse trap type device, which is controlled by trip mechanism 44. Conduction of SCR 41 activates solenoid 43 which activates trip mechanism 44. When the trip mechanism is activated, the spring loaded contacts 26 and 28 latch open, and stay open until they are manually reset.

An arc fault sensing current transformer 1 is wrapped with a secondary winding 4, which surrounds the line conductor 7. The transformer has a core type, number of windings, secondary loading, and size which are selected to produce an output voltage proportional to step changes (di/dt) in current. The core is also selected to saturate at a predetermined level of primary current. The saturation acts to clamp the maximum di/dt voltage signal at the transformer output. This eliminates the effect of brief high current pulses of short duration from having the same effect on the detector as a series of smaller amplitude arc faults steps. Clamping the amplitude by saturation prevents false triggering on load events such as lamp filament burnouts which cause brief high current pulses.

The hot conductor 7 is used as the arc fault sensed conductor as any current arcing to neutral or ground will be supplied from this wire. The current transformer 1 is connected to bridge rectifier 10 by way of series capacitor 8. Capacitor 8, which in conjunction with resistor 8a, acts as a high pass filter for rejecting 60 hz sinusoidal signals. Capacitor 8 and resistor 8a may be eliminated without loss of arc fault detection but with an increased susceptability to false detection from large magnitude 60 HZ load currents such as may occur during motor start ups.

When an arc fault occurs, step changes in current produce rectified pulses at the output of bridge rectifier 10. The rectified pulses are integrated by an integrator 24, for a predetermined time interval. The repeated charge pulses act to charge capacitor 16, and raise the voltage across capacitor 16 to the trigger threshold of diac 18. Diac 18 is a trigger device which triggers into conduction at one voltage, and which then shuts off at a lower voltage. The diac conduction discharges a portion of the charged stored in capacitor 16 into the gate 22 of SCR 41 triggering the SCR into conduction. SCR 41 conduction energizes solenoid 43, which activates trip mechanism 44, opening contacts 45.

Capacitor 6 is used for transient suppression of noise at frequencies above that required for arc detection. Capacitor 20 acts to suppress noise voltage that may cause false triggering of SCR 41. Zener diode 10a is an optional voltage clamp, or limiter connected between the output of bridge rectifier 10 and circuit common 46, and performs the same function as the saturating current transformer in limiting the di/dt voltage pulses to a constant level. Resistor 14 discharges the integrator capacitor 16 after a pulse charging sequence has terminated. Resistor 8a is a bleeder resistor for capacitor 8 and performs the same function as resistor 14. An optional inductor 11, which negates the need for a saturating current transformer, as shown may be placed between the current transformer 1 and the integrator 24 which acts as an attenuating impedance for large di/dt pulses such as may occur during lamp burnout.

Unlike most or all of the prior art, this design is very simple, and has the advantage of not requiring a DC power supply.

FIG. 1b shows another circuit embodiment of the sensor transformer, high pass filter, and rectifier. This circuit performs the same functions of high pass filter and rectifier as shown in FIG. 1a with an additional voltage doubler feature. Capacitors 90 and 92 form a high pass filter with resistors 94 and 96 and also act as voltage doubler elements. An arc step in one direction causes a positive voltage at secondary output 91, developed across winding 4b, with respect to the transformer center tap 83 held at circuit common. The same arc step also produces a negative voltage at secondary output 97, developed across winding 4a, with respect to the center tap 83. The positive voltage at output 91, drives part of the current through capacitor 92, which current is rectified by diode 99, and then passes out to the sensor pulse line 9. At the same time, the negative voltage at 97 causes a current to pass from the center tap 83 through diode 98 and capacitor 90 and back to the transformer secondary at 97. This current charges capacitor 90 with a positive polarity at junction 82, with respect to transformer secondary output 97, and causes the capacitor to store charge. When an arc step in the other direction occurs, output 97 of secondary 4a becomes positive with respect to the center tap. This voltage drives a current through capacitor 90, then part of the current into diode 95, and out to signal line 9. The part current moves most of the stored charge in capacitor 90 plus the new charge arriving with the current from the transformer into the integrator capacitor 16, where it acts to pump the voltage above the level that would have occurred without the stored charge in capacitor 90. The next arc step in of the opposite polarity causes the same charge pump action out of capacitor 92. This action causes capacitors 90 and 92 to act as charge pump capacitors repeatedly charge pumping the integrator capacitor 16. Resistors 80 and 81 are optional bleeder resistors for capacitors 90 and 92. In operation the circuit losses, along with the bleeder resistor discharge action on the capacitors, prevents actual voltage doubling. The voltage doubler action allows a sensor with fewer windings, when responding to lower arc sense pulse amplitudes, to produce the same diac trigger voltage as would occur without the doubler action. Those skilled in the art will understand that the components connected across one half of the secondary shown in FIG. 1a could be used with an untapped secondary winding, which produces a voltage doubler circuit that responds only to arc steps in one direction.

Figure 2:
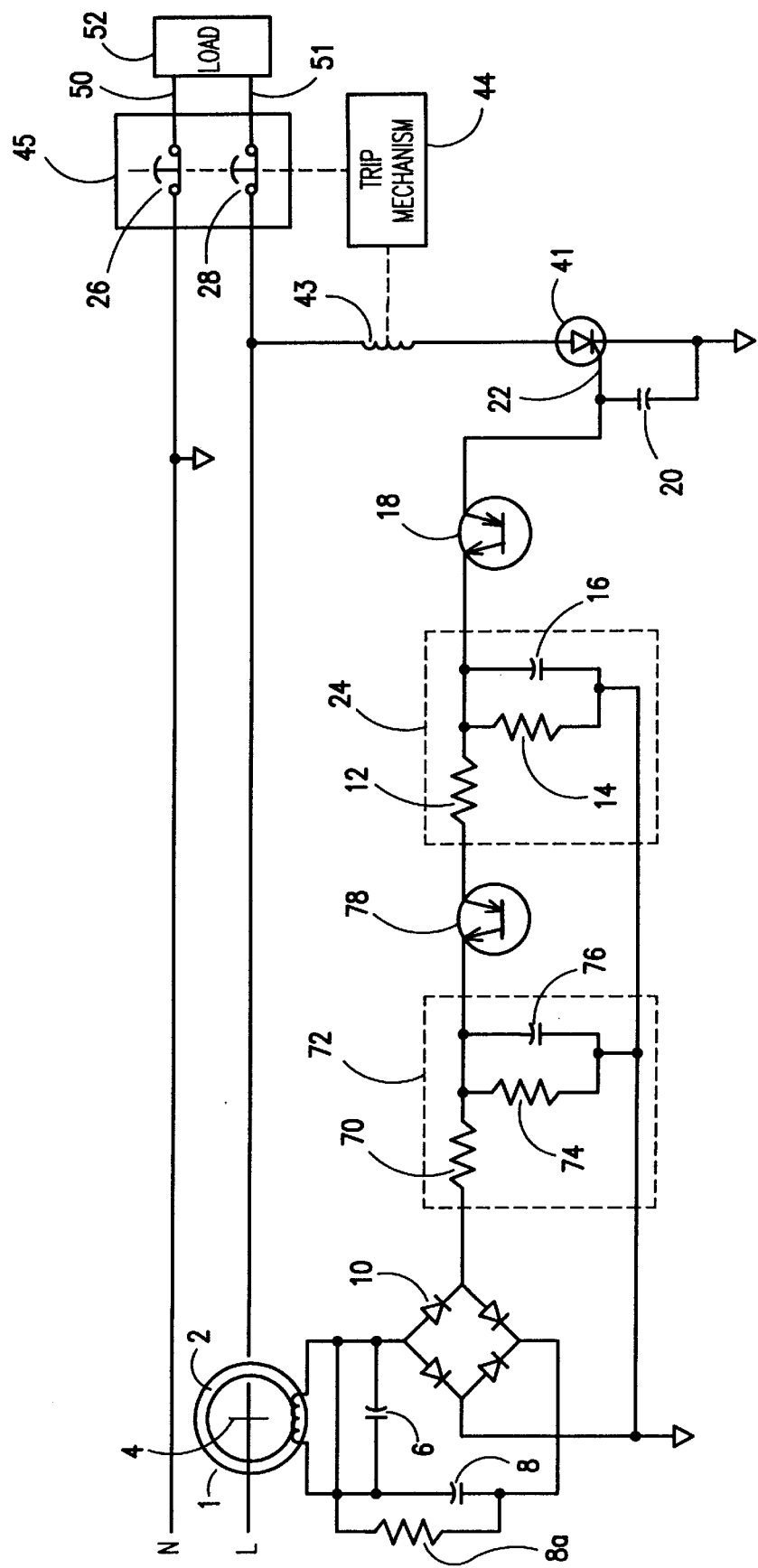
FIG. 2 illustrates another embodiment of the circuit of FIG. 1 showing an additional integrator element with a discharge diac.

FIG. 2 shows a further embodiment to the circuit of FIG. 1. All other like parts are like numbered. In this embodiment integrator 68 is of a lower timer constant than integrator 24. Diac 66 has a higher trigger voltage than diac 18. When integrator capacitor 64 quick charges on a large arc signal pulse, which causes the voltage of the capacitor 64 to reach the trigger threshold of diac 66, a pulse of charge is removed from capacitor 64 by diac 66. In this manner large arc signal pulses caused by lamp burn out type events are mitigated by the charge dump action of diac 66. The diac 66 acts as a superior clamp to that of a zener diode as short duration arc pulses occurring from lamp burnout cause a discharge action on integrator capacitor 64 instead of only a clamping action In this way the charge effect on the detector of a short duration high current pulse is quickly mitigated. During actual high current arc faults which may also trigger the charge dump diac 66, the repetitive signal pulses pass enough charge into integrator 24 before the charge dump diac 66 is triggered to cause charging action of integrator 24. This activates diac 18 and SCR 41.

Figure 3:
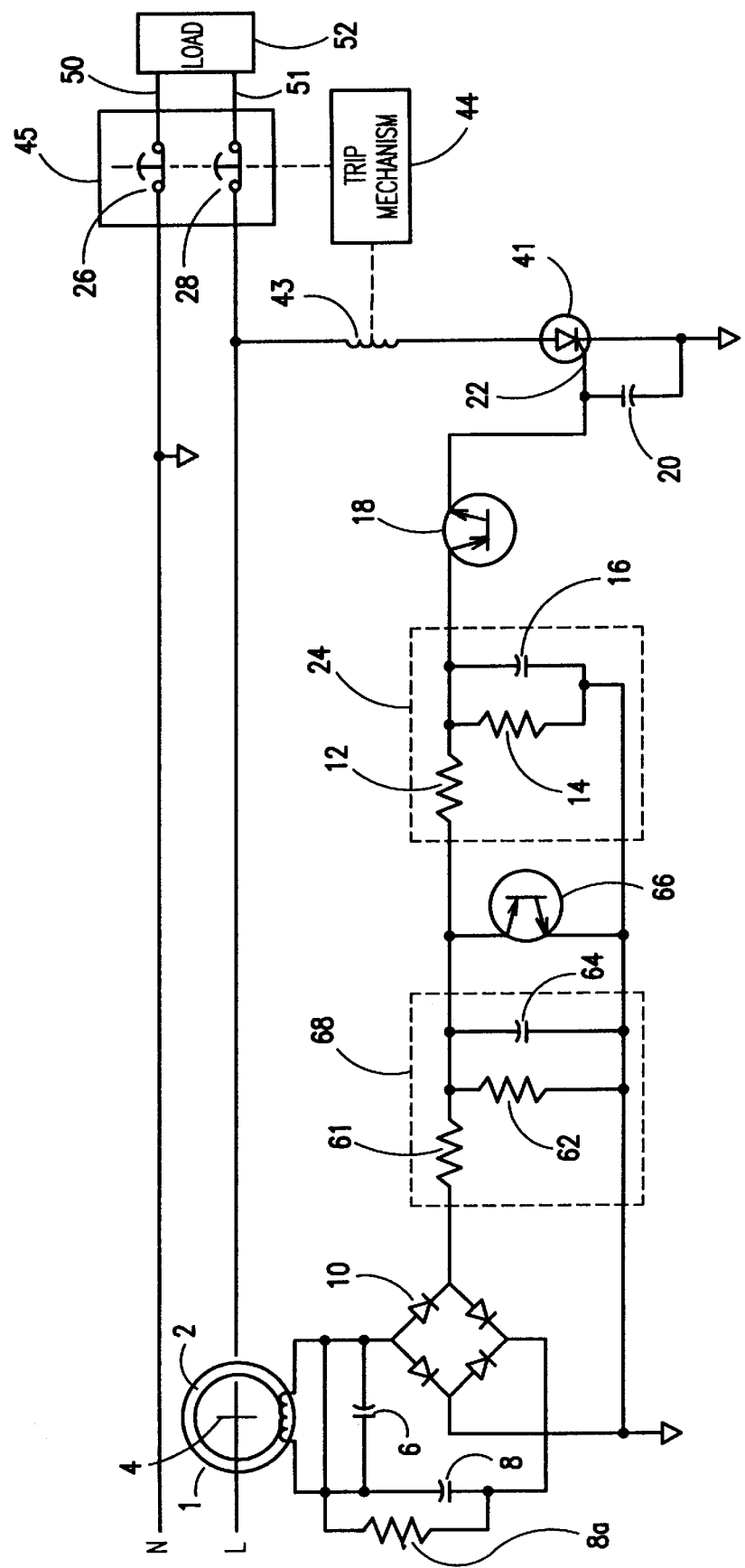
FIG. 3 is a schematic diagram of an art fault circuit interrupter in accordance with another embodiment of the invention.
Figure 4A:
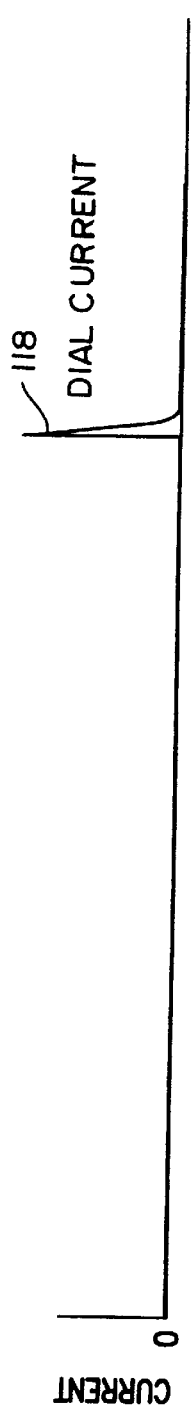
FIG. 4(a–e) illustrates waveforms in the circuit of FIG. 3.
Figure 4B:
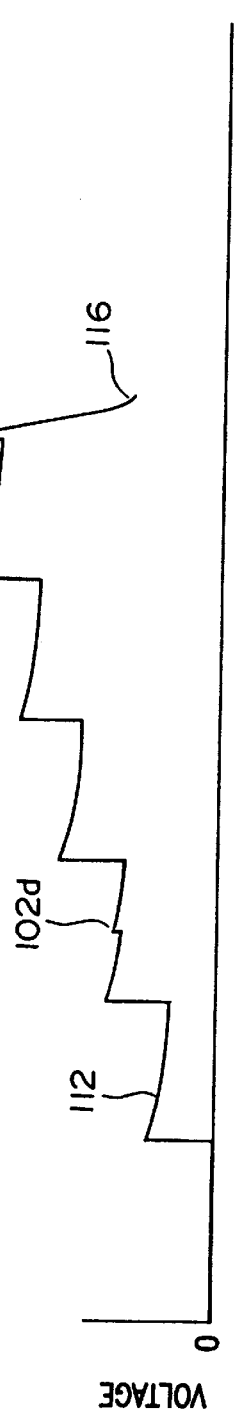
Figure 4C:
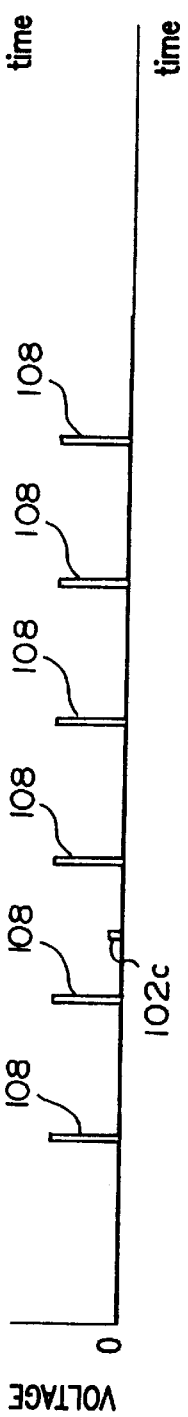
Figure 4D:
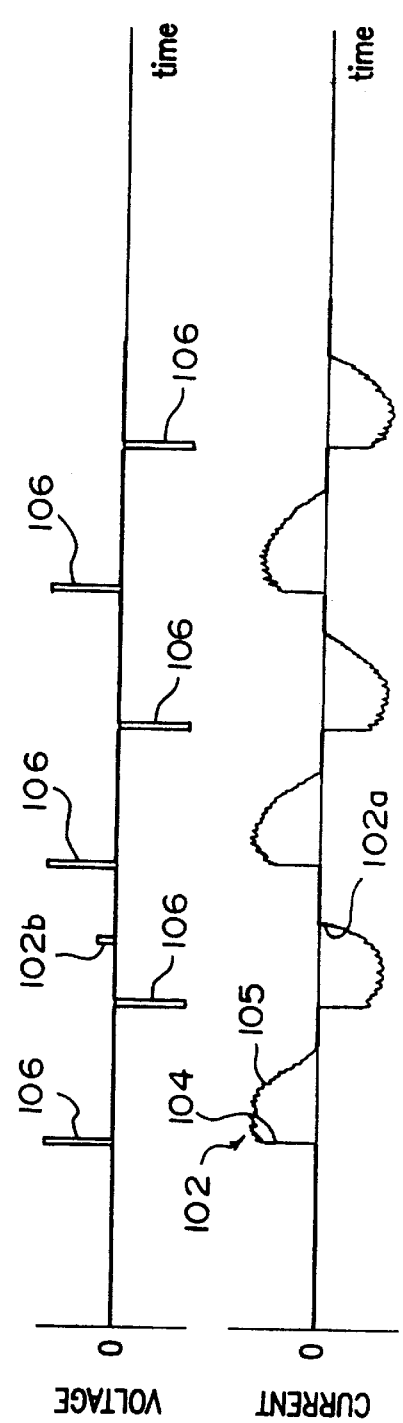
Figure 4E:
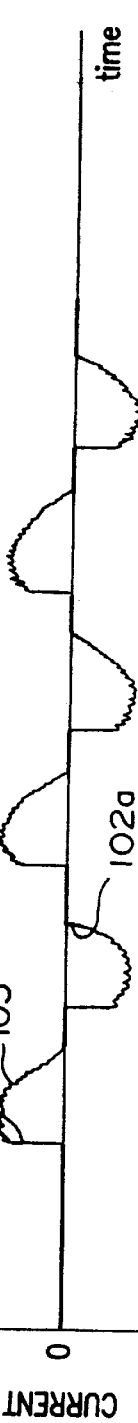

Referring now to FIG. 3, an arc fault circuit interrupter in accordance with another aspect of this invention is illustrated in schematic diagram form. The interrupter is similar to the embodiment of the invention shown in FIG. 1 in many respects, and to that end, like components designated by like reference numbers. Arc fault sensing current transformer 1 is responsive both to the rate of change of current with respect to time (di/dt) and to the 60 Hz arc current produced by an arc fault.

During an arc fault, a large di/dt pulse is typically produced along with a sustained 60 Hz arc current signal. The di/dt current pulse is rectified by bridge rectifier 10 and is conducted by blocking diode 101 to integrator 24 where it acts to charge integrator cap 16. Diac 18 is selected so that if the voltage across integrator capacitor 16 exceeds a predetermined magnitude, diac 18 conducts and a signal is applied to the drain of fet 106.

The output of bridge rectifier 10 is also connected through decoupling resistor 118 to zener diode 116. Zener diode 116 clamps and strips the di/dt pulse off of the rectified 60 Hz arc current. The di/dt stripped rectified 60 Hz arc current is applied to integrator 114 where it acts to charge capacitor 115. When the voltage across the integrator capacitor 115 rises above the clamp voltage of zener 118, the gate of fet 106 is enabled. In this way, both the the minimum di/dt value and the minimum 60 Hz arc current value must exceed the predetermined thresholds before fet 106 will conduct and provide a turn on signal to gate 22 of SCR 41, which activates solenoid 43 and trip mechanism 44, disconnecting the load from the source. Zener 118 may be replaced by trigger device, such as a second diac, for snap action triggering of the fet 106 gate.

Preferably a zener diode 102 is connected across the output of integrator 24 to limit the voltage applied to diac 18. The zener 102 is required to protect the drain source junction of fet 106 from any excessive voltage that may appear across capacitor 16 and diac 18 when fet 106 is held in the off state. Alternately, zener diode 104 is connected between the fet 106 drain and circuit common, to limit the voltage that can be applied at the drain. The diodes 102 or 104 are required when di/dt pulses occur without an accompanying predetermined 60 hz current peak indicative of an arc fault. In this situation diac 18 could not prevent capacitor 16 from continuing to charge past the diac trigger voltage allowing an excessive voltage to build up at the fet 106 drain. These types of pulses can be generated by light dimmers or phase controlled motor controllers.

The circuit shown in FIG. 3 is particularly well suited to discriminate between the high di/dt signals produced by lamp dimmers and the like, which are not accompanied by sustained 60 Hz arc current, from actual arcs which include both a high di/dt current and sustain 60 Hz arc current exceeding a preselected value.

FIG. 4(a–e) illustrate waveforms generated in the circuit of FIG. 1. A typical arcing current waveform is shown at 102 in FIG. 4a. Step 104 in FIG. 4a shows one of the step increases in current that generates waveform 106 shown in FIG. 4b at the secondary 4 of transformer 1. The arc current 102 in FIG. 4a will have broad band noise shown at 105. Typically the arc extinguishes at the next current zero cross but in some cases may have a sharp extinguishing edge as shown at 102a in FIG. 4a which may generate a weak pulse shown at 102b, 102c and 102d in FIG. 4b, 4c, and 4d respectively. FIG. 4c pulse 108 shows the bridge rectified pulses. FIG. 4d charge waveform 112 shows the integrator capacitor 16 pulse charging. At 114 in FIG. 4d, the diac triggers into conduction sending a pulse of current 118 into SCR gate 22 causing the SCR to conduct. When the SCR conducts solenoid 43 is energized and activates trip mechanism 44. This opens contact 45 disconnecting the load. Waveform 116 in FIG. 4d shows capacitor 16 discharging to the diac turn off voltage.

While the invention has been described in connection with a number of presently preferred embodiments thereof, those skilled in the art will recognize that many modifications and changes may be made therein without departing from the true spirit and scope of the invention, which accordingly is accordingly is intended to be defined solely by the appended claims.

What is claimed is:

1. An arc fault circuit interrupter comprising:
    a sensor responsive to an arc fault for generating a first signal proportional to the rate of change of current with respect to time, and a second signal proportional to the AC power line frequency current produced by the arc;
    a first detector responsive to the first signal for generating a first fault signal when the rate of change of current with respect to time exceeds a predetermined value;
    a second detector responsive to the second signal for generating a second fault signal if the peak ac power line frequency current exceeds a predetermined value; and
    a switch for triggering a circuit disconnector only when both the first and second fault signals are generated.

2. The arc fault circuit interrupter of claim 1 in which all of the power for the circuit is generated by the sensor, so that no power supply is required.

3. The arc fault circuit interrupter of claim 1 comprising a bridge rectifier connected to the sensor.

4. The arc fault circuit interrupter of claim 3 in which the first detector comprises an integrator connected to the bridge rectifier by a blocking diode.

5. The arc fault circuit interrupter of claim 3 in which the second detector comprises a decoupling resistor, a clamping diode, and an integrator connected to the bridge rectifier.

6. The arc fault circuit interrupter of claim 1 in which the switch comprises a field effect transistor, and wherein the first and second detectors are connected to the field effect transistor.

7. The arc fault circuit interrupter of claim 1 comprising a diac connected between the first detector and the switch.

8. The arc fault circuit interrupter of claim 1 comprising a zener diode connected between the second detector and the switch.

9. A device for detecting arc faults in an electric power circuit, comprising:
    a sensor coupled to said electric power circuit, wherein said sensor generates a pulse each time an arc is struck; and
    a detector coupled to said sensor and responsive to said pulse for generating a signal indicating a presence of said arc, wherein said detector is powered solely by a plurality of said pulses.

10. A device according to claim 9, further comprising an integrator connected to said sensor for accumulating said plurality of pulses and generating an output voltage, wherein said integrator is powered solely by said plurality of pulses.

11. A device according to claim 10, further comprising a charge pump capacitor connected between said sensor and said integrator.

12. A device according to claim 10, further comprising a limiter connected between said sensor and said integrator.

13. A device according to claim 12, wherein said limiter includes an inductor.

14. A device according to claim 9, wherein said sensor includes a transformer having a center-tapped secondary.

15. A device according to claim 9, wherein said sensor is a transformer wherein a primary winding of said transformer is a line of the sensed electric power circuit, and wherein a secondary winding of said transformer produces a plurality of pulses proportional to the di/dt of current in said primary winding.

\* \* \* \* \*